May 31, 1960    G. S. SCHATZMAN ET AL    2,938,540
QUICK ACTING FLUID PRESSURE ACTUATED VALVE
Filed July 17, 1957
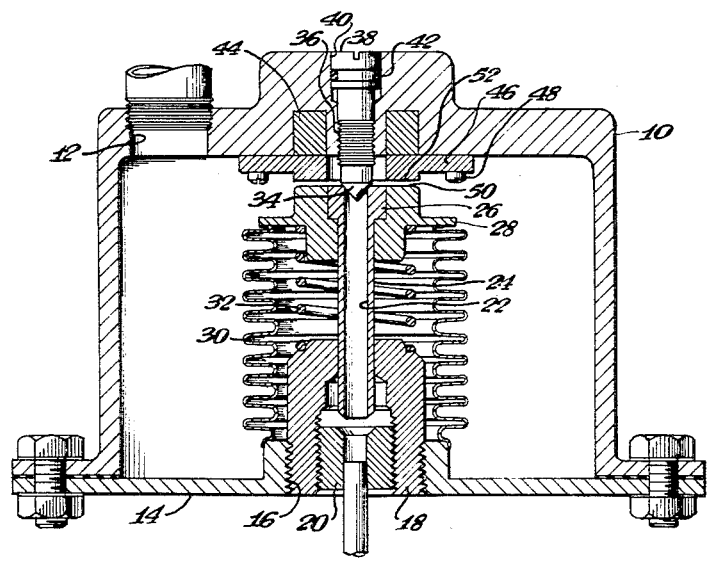
INVENTORS.
George S. Schatzman
Robert G. Purdy.
BY
ATTORNEY.

2,938,540

QUICK ACTING FLUID PRESSURE ACTUATED VALVE

George S. Schatzman, Fullerton, and Robert G. Purdy, Los Angeles, Calif., assignors to Robertshaw-Fulton Controls Company, Richmond, Va., a corporation of Delaware Filed July 17, 1957, Ser. No. 672,454

5 Claims. (Cl. 137—508)

This invention relates to valves and more particularly to differential pressure actuated valves.

An object of this invention is to utilize a relatively small change in position to produce a relatively large change in force for operating the valve with snap action.

Another object of the invention is to combine magnetic and spring forces to produce the desired snap action.

Another object of the invention is to utilize the pressure of the controlled fluid for causing actuation of the valve between controlling positions.

Other objects and advantages will become apparent as this description proceeds. The valve structure embodies a casing having an inlet for the controlled fluid and an outlet which is controlled by a reciprocable valve element. In this embodiment the valve element comprises a valve seat which is biased to closed position and is cooperable with a permanent magnet which also exerts a closing force thereon through a predetermined magnetic field. An expansible and contractible pressure responsive element is connected to the valve seat and subjected to the inlet fluid pressure for opening the valve. As the valve seat initially moves to open position through the effective magnetic field, the magnetic gap increases slightly causing a relatively large decrease in magnetic force on the valve seat. When the force is sufficiently lessened, the valve seat moves with a snap action to open position and allows flow of fluid through the outlet. A converse operation with similar snap action occurs upon the decrease in pressure of the controlled fluid acting on the bellows element.

The single figure of the drawing is a cross-section of a valve structure illustrating one embodiment of the invention.

Referring more particularly to the drawing, a cup-shaped casing 10 is provided with an inlet opening 12 in the bottom wall thereof for the reception of a pipe or conduit conveying pressure fluid to the casing 10. The open end of the casing 10 has a closure plate 14 secured thereto which is provided with an axial threaded opening 16 forming an outlet for the fluid.

A bushing 18 threadedly engages the wall of the opening 16 and extends partly into the casing 10. The bushing 18 is internally threaded for the reception of an adjustable stop member 20 which is axially apertured to provide for passage of fluid through the outlet. Beyond the internally threaded portion, the bushing 18 has a plain bore in which a tubular valve seat member 24 having a bore 22 is reciprocable and is engageable with the stop member 20 in one position. Preferably the engaging surfaces of the valve seat 24 and the stop member 20 have complemental conical surfaces to insure seating engagement therebetween.

The opposite end of the valve seat 24 is provided with an enlarged head 26 which fits within a counterbored end flange member 28 through which the valve seat 24 extends. The end flange 28 forms a closure for one end of a pressure responsive means in the form of an expansible and contractible bellows 30, the opposite end of which is secured by soldering or other suitable means to the closure plate 14 adjacent the bushing 18. It will be apparent that the end flange 28 could be integral with the valve seat 24 and, in any event, will form a sealed fluid pressure chamber between the valve seat and the casing which may contain air or any other suitable fluid at any desired pressure. Means for biasing the valve seat 24 away from the stop member 20 to one controlling position is provided and takes the form of a coil spring 32 operative between the stop member 20 and the end flange 28 for this purpose.

A relatively stationary but adjustable valve member is cooperable with the movable valve seat 24 to control the flow of fluid from the inlet 12 to the outlet 16 through the tubular valve seat 24. To this end, a conical projection 34 is carried in a threaded aperture 36 formed in the bottom wall of the casing 10 in axial alignment with the valve seat 24. The conical projection 34 is provided with an enlarged head 38 rotatable in a counterbore portion 40 of the threaded aperture 36 by means of a screwdriver or other suitable tool. Preferably, sealing means in the form of an O-ring 42 is provided on the enlarged head 38 for engagement with the wall of the counterbore 40.

An annular permanent magnet 44 is housed within a recess in the bottom wall of the casing 10 surrounding the conical projection 34. A retaining plate 46 is secured in underlying relation to the magnet 44 by screws or other suitable means extending through the bottom wall of the casing 10. In the arrangement described, the end flange 28, which is of magnetic material, has an end face 50 in proximate relation to the end face 52 of the retainer plate 46. Hence, it will be apparent that the conical projection 34 can be adjusted in the threaded aperture 36 to vary the effective field for the magnet 44 by moving the end face 50 relative to the end face 52 to vary the magnetic gap therebetween. It will be apparent from this description that such effective field need not be physically or otherwise equivalent to the true magnetic field of the magnet 44 but may encompass only a portion thereof.

The operation of the valve structure will be apparent from the foregoing description and need only be briefly referred to here. Suffice it to say that a pressurized fluid may flow through the inlet 12 into the casing 10 and exert a force upon the area of the exposed surface of the end flange 28 of the bellows 30. Upon a predetermined force being thus exerted, the bias of the spring 32 is overcome and the magnetic gap between the end faces 50 and 52 is increased. Since a slight increase in the gap causes a large decrease in magnetic force, the valve seat 24 is moved out of the effective field of the magnet with a snap action until it engages the stop member 20 in its full open position. The fluid from the inlet 12 is now free to flow through the hollow valve seat 24 and the outlet 16.

Upon a decrease of pressure in the fluid in the casing 10, the bias of the spring 32, assisted by the bellows 30, causes movement of the end face 50 toward the end face 52 and thus into the effective field of the magnet 44. As soon as such diminution of the magnetic gap occurs, the valve seat 24 moves to closed position relative to the valve member conical projection 34 with snap action. The distance between the end faces 50 and 52 which establishes the magnetic gap and hence the magnetic force, is adjusted by movement of the conical projection 34 relative to the valve seat 24. The gap so set corresponds to a predetermined fluid pressure sufficient to overcome the bias of the spring 32 and open the valve as described. The force exerted by the spring 32 is adjusted by rotation of the bushing 18 in the threaded opening 16.

From the foregoing, it will be apparent that the action and principle of operation is based on the fact that over the range used, the spring force is a linear function while the magnetic force is a nonlinear, hyperbolic function depending on magnetic gap. The summation of these forces changes rapidly when the magnetic gap changes a very small amount. This rapid change of force over a small change in magnetic gap which occurs when the valve is either opening or closing causes a resultant snap action as described. Thus, differential pressure actuated valves may be made to close tolerances, high accuracy and repeatability.

While only one embodiment of the invention has been disclosed, it will be apparent that many changes may be made in the details of construction and arrangement of parts without departure from the scope of the invention as defined in the appended claims.

We claim:

1. A valve structure comprising a casing having an inlet and an outlet opening for fluid under pressure, a valve member in said casing between said inlet and outlet openings, a tubular valve seat movable between positions relative to said valve member and being cooperable therewith for controlling flow of fluid in said casing, armature means connected to said valve seat, stop means in said casing for operative engagement with said valve seat and having an aperture communicating with said outlet and said tubular valve seat, means for biasing said valve seat toward one controlling position relative to said valve member, magnetic means carried by said casing in proximate relation to said armature means and said valve seat, means for adjusting said proximate relation to establish a variable effective holding force for said valve seat in said one position and cooperable with said biasing means for holding said valve seat in said one position, and pressure responsive means operatively associated with said valve seat and responsive to a predetermined variation in pressure in said casing for overcoming the holding force and said biasing means, said valve seat being thereby moved substantially out of the field of said magnetic means toward said stop means with resultant snap action.

2. A valve structure comprising a casing having an inlet and an outlet opening for fluid under pressure, a conical projection extending into said casing and forming a valve member between said inlet and outlet openings, a tubular valve seat in axial alignment with said projection and said outlet opening, said valve seat being reciprocable between open and closed positions relative to said valve member and being cooperable therewith for controlling flow of fluid in said casing, armature means operatively associated with said valve seat, stop means positioned in said casing adjacent said outlet and being operatively engageable with said valve seat in said open position, said stop means having an aperture communicating with said outlet and said tubular valve seat, an annular permanent magnet in said casing surrounding said projection, retaining means for said magnet carried by said casing, a coil spring operative between said stop means and said valve seat for biasing said valve seat toward said closed position, means for adjusting said projection relative to said valve seat for varying the effective holding force of said magnet cooperable with said spring for holding said armature means and said valve seat in said closed position, and a tubular bellows extending between said valve seat and said stop means and responsive to a predetermined variation in pressure in said casing for overcoming the bias of said spring, said valve seat being thereby moved substantially out of the field of said permanent magnet with resultant snap action.

3. A valve structure comprising a casing formed with an inlet and an outlet for fluid under pressure, an adjustable valve member disposed in said casing between said inlet and said outlet, a valve seat movable between positions relative to said valve member and being cooperable therewith for controlling a flow of fluid through said casing, means for biasing said valve seat toward one controlling position relative to said valve member, annular permanent magnetic means mounted in said casing surrounding each said valve member and said valve seat respectively and being in proximate relation to said valve seat, said magnetic means being cooperable with said biasing means for holding said valve seat in said one position, means for adjusting the position of said valve member to vary the effective holding force of said magnetic means, and pressure responsive means operatively associated with said valve seat and being responsive to a predetermined variation in pressure in said casing for overcoming said biasing means, said valve seat being thereby moved out of said one position with resultant snap action.

4. A valve structure for controlling the flow of a pressurized fluid comprising a casing having an inlet and an outlet, an adjustable valve member disposed in said casing between said inlet and said outlet, a valve seat movable between positions relative to said valve member and being cooperable therewith for controlling a flow of fluid through said casing, means for biasing said valve seat toward a closed position relative to said valve member, annular permanent magnet means disposed in said casing surrounding said valve member, armature means associated with said valve seat, said magnet means being cooperable with said biasing means for holding said armature means and said valve seat in said closed position, means for adjusting the position of said valve member to vary the effective holding force of said magnet means, and an expansible and contractible pressure responsive means connected to said valve seat and being responsive to a predetermined variation in pressure in said casing for overcoming said biasing means and said magnet means to move said valve seat from said closed position to an open position with resultant snap action.

5. The valve structure of claim 4, wherein said pressure responsive means comprises a bellows extending between said valve seat and said casing to form a fluid pressure chamber therebetween.

References Cited in the file of this patent
UNITED STATES PATENTS

| 1,821,189 | Meinken et al. | Sept. 1, 1931 |
| 2,288,882 | Binckley | July 7, 1942 |
| 2,412,725 | Fitch | Dec. 17, 1946 |
| 2,538,436 | Weinberg | Jan. 16, 1951 |
| 2,644,477 | King | July 7, 1953 |